United States Patent [19]

Kolvites

[11] Patent Number: 5,022,777
[45] Date of Patent: Jun. 11, 1991

[54] POST CONNECTOR

[75] Inventor: Albert Kolvites, Mountaintop, Pa.

[73] Assignee: InterMetro Industries Corporation, Wilkes-Barre, Pa.

[21] Appl. No.: 527,387

[22] Filed: May 23, 1990

[51] Int. Cl.5 .............................................. B25G 3/00
[52] U.S. Cl. ..................................... 403/14; 403/292; 403/298
[58] Field of Search ................ 403/292, 298, 280, 14; 411/479, 456

[56] References Cited

U.S. PATENT DOCUMENTS 1,354,549  10/1920  Gilmer ................................ 403/280
3,352,191  11/1967  Crawford ....................... 403/292 X

FOREIGN PATENT DOCUMENTS 2725921  12/1978  Fed. Rep. of Germany ...... 403/292

Primary Examiner—Andrew V. Kundrat
Attorney, Agent, or Firm—Fitzpatrick, Cella, Harper & Scinto

[57] ABSTRACT

A connector sleeve device for connecting together first and second posts comprises a sleeve having an outer surface dimensioned to be received within the interior surfaces of the first and second posts. A first flexible protrusion is formed in a mid-region of the sleeve and has an abutment surface adapted to abut an end surface of the first post when the sleeve is received therein. The contact between the abutment surface and the end surface prevents the sleeve from being moved further into the first post. A second flexible protrusion is formed in the mid-region of the sleeve and has a second abutment surface adapted to abut an end surface of the second post when the sleeve is inserted into the second post. The contact between the second abutment surface and the end surface of the second post prevents the sleeve from being moved further into the second post. The abutment surfaces of the first and second flexible protrusions are formed in substantially the same cross-sectional plane relative to the sleeve so that the end surfaces of the first and second posts can mate together, making the sleeve substantially invisible. Preferably, the flexible protrusions are inclined tabs disposed on opposite sides of a hollow cylindrical sleeve, and a compression slot is formed in the sleeve to provide a tight friction fit between the sleeve and the posts.

14 Claims, 1 Drawing Sheet

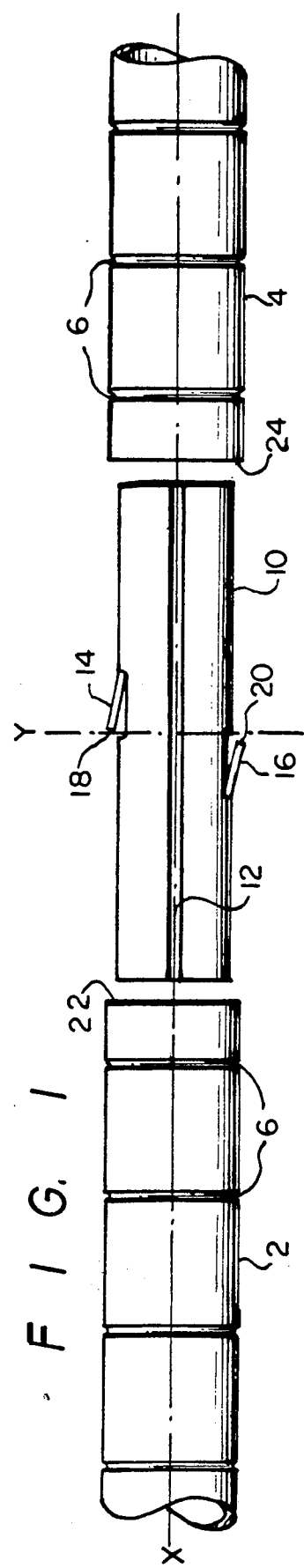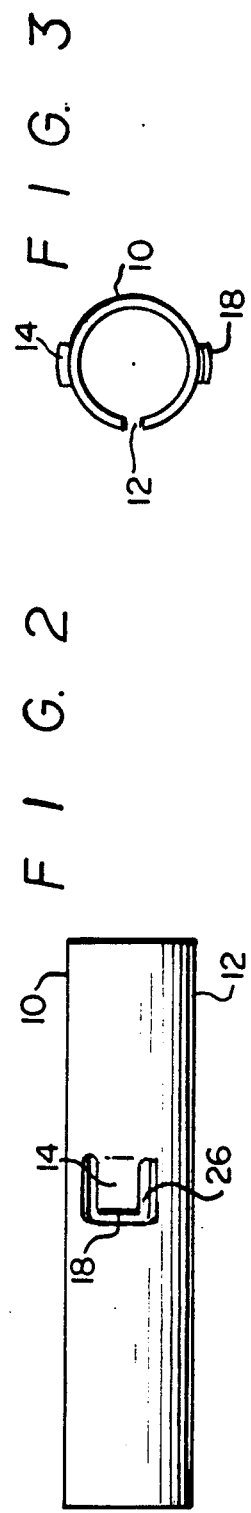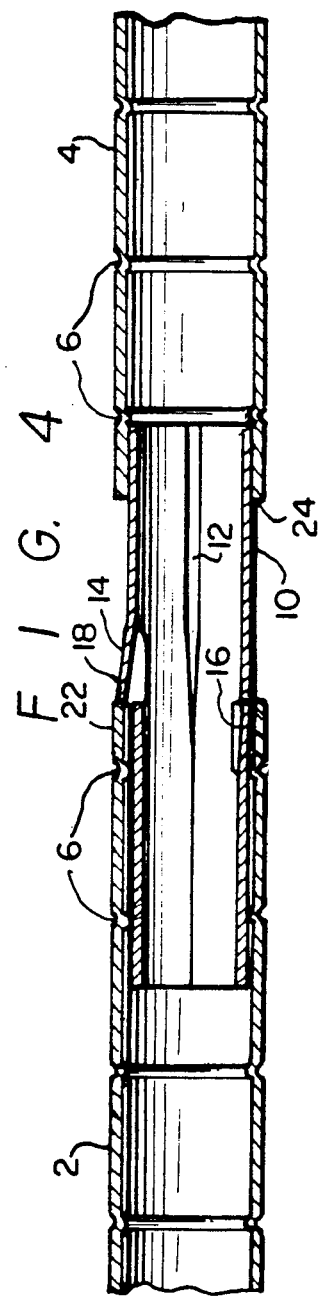

POST CONNECTOR

BACKGROUND OF THE INVENTION

1. Field of the Invention

This invention relates to post a connector device, and particularly, to a connector that quickly, reliably, and invisibly connects first and second hollow posts.

2. Description of the Prior Art

Many products now on the market include hollow load-bearing posts, such as shelving, and the like. The transportation of such products has often been unwieldy and expensive due to the extensive length of the support posts. Shipping such posts in smaller segments would be advantageous, except for the difficulty of quickly and easily assembling the posts such that they retain the load-bearing capabilities of a unitary structure. Further, many of the known devices for coupling post segments together include structure on the outside of the posts, thus displaying an unsightly connection, and providing an element that may interfere with the operation of the post itself. For example, shelving systems are known wherein the shelves are vertically adjustable with respect to a plurality of posts. Any coupling structure attached to the outside of such posts would make the vertical adjustment of the shelves difficult or impossible.

Connecting post segments together with structure inside the segments often requires wedges, clamps, screws, or other hardware that in turn require extensive manipulations for assembly. In addition, such interior structures may be mislocated relative to the joint between two post segments, thus inviting mechanical failure of the post itself or at the joint.

Connectors having a centrally located circumferential rib on their outer surface are also known. The rib prevents the connector from being inserted too far into either of the post segments coupled together. However, such a rib is visible when the assembly is complete. Such arrangement is also less than satisfactory in applications that require highly sanitary conditions.

Therefore, it is desireable to provide a post connector structure that is easy to manufacture, easy to assemble, and inexpensive, yet provides an invisible, strong connection between post segments.

SUMMARY OF THE INVENTION

The present invention provides a post connector that overcomes many of the disadvantages of known connectors, such as those described above.

In its preferred embodiment, the present invention includes a connector sleeve for connecting together first and second posts. The sleeve has an outer surface dimensioned to slide tightly with a friction fit within the interior surface of both the first and second posts. A first flexible protrusion is formed at a mid-region of the sleeve and has a first interference or abutment surface adapted to abut an edge surface of the first post when the sleeve is inserted into the first post. This protrusion prevents the sleeve from being moved further or excessively into the first post. A second flexible protrusion is also formed in the mid-region of the sleeve and has a second interference or abutment surface adapted to abut an edge surface of the second post when the sleeve is inserted into the second post. Again the second protrusion prevents the sleeve from being moved further or excessively into the second post. The second interference surface is disposed substantially in the same radial plane as the first interference surface to cause the edge surfaces of the first and second posts to come into contact when the sleeve is assembled with them. When the first and second posts edge surfaces come together, the flexible protrusions may be moved out of abutting engagement with the post edge surfaces.

In accordance with a further aspect of the present invention, a post connector for connecting together first and second posts includes a compressible insert adapted to be partially inserted into each of the first and second posts. The insert has a compression slot extending in the axial or longitudinal direction thereof to allow the insert to be compressed to provide a tight friction fit inside the first and second posts. First and second inclined protrusions extend from the outer surface of said insert and incline in opposite directions. Each protrusion has an abutment surface for abutting an engaging surface of a respective post. The abutment surfaces are substantially radially coplanar or slightly spaced away from each other relative to the radial plane to cause the engaging surfaces of the first and second posts to be adjacent each other with the insert substantially entirely within the posts and equally within the respective posts when the posts are connected together.

In accordance with still a further aspect of the present invention, a connector for coupling together first and second posts includes a bushing adapted to fit partially within the first post and partially within the second post, the bushing being compressible to provide a flush fit between it and each of the posts. First and second tabs are disposed on the bushing and engage respective end surfaces of the post. Each tab has a first position protruding from the outer surface of the bushing to engage one of the post end surfaces, and a second position substantially flush with the outer surface of the bushing. The tabs are biased toward their first position to cause the bushing to assume a predetermined positional relationship with respect to the posts when the posts are forced together. Forcing the posts together causes the tabs to be moved to their second positions.

Preferably, the interference or abutment surfaces of the protruding tabs are disposed approximately at the center of the bushing so that when the first and second posts are joined together, one half of the bushing extends into each of the posts. This configuration aids in the structural stability of the connector.

Also and preferably, the bushing is a one-piece hollow cylindrical piece of rolled steel, the tabs being integral therewith. The first and second posts may, in certain applications have annular rings on their interior surfaces to compress the bushing together and to provide a secure contact between the posts and the bushing.

The advantageous structure and functions according to the present invention will be become apparent from the following detailed description of the preferred embodiment, when taken in conjunction with the accompanying drawings.

BRIEF DESCRIPTION OF THE DRAWINGS

FIG. 1 is a side view of the first and second posts, and the connector sleeve according to the preferred embodiment of the present invention.

FIG. 2 is a top view of the connector sleeve shown in FIG. 1.

FIG. 3 is an end view of the connector sleeve shown in FIG. 1.

FIG. 4 is a cross-sectional view showing the connector sleeve of FIG. 1 partially installed between the first and second posts.

DETAILED DESCRIPTION OF THE PREFERRED EMBODIMENT

The present invention will allow the connection of post segments in a nearly invisible manner while retaining substantially the same structural strength as the original post itself.

In FIG. 1, a first hollow post segment 2 is connected to a second hollow post segment 4 using the connector sleeve or bushing 10 inserted half-way into each of the post segments 2 and 4. As shown in the Figures the posts and connector sleeve are cylindrical. However, these elements may be of any desired cross-sectional configuration. The outside diameter of the sleeve 10 is designed to provide a tight friction fit with the inside diameter of the post segments 2 and 4. Alternatively, in some applications, the post segments 2 and 4 may each have a plurality of annular rings 6 on the inside surface thereof to provide the appropriate flush fit with the sleeve 10. For example, the outside diameter of the sleeve 10 is slightly larger than the inside diameter of the annular rings 6, but slightly smaller than the inside diameter of the post segments 2 and 4 at a location spaced from the annular rings 6.

The sleeve 10 has an axial or longitudinal compression slot 12 that allows the sleeve 10 to compress slightly as it is forced through the annular rings 6. Thus, the natural spring force in the sleeve 10 will tightly grip the annular rings 6 ensuring a solid, reliable connection. It is desireable that the width of the slot 12 in the relaxed state of the sleeve 10 be such that when the sleeve is inserted into a post section, the slot 12 collapses essentially completely. This configuration enhances the bending strength of the connection.

The sleeve 10 includes first and second protruding tabs 14 and 16, respectively, punched from or otherwise integrally formed in the side wall of the sleeve. These tabs are inclined away from the outer surface of the sleeve 10 in opposite directions as shown in FIGS. 1 and 3. The protruding tabs 14 and 16 have interference or abutment surfaces 18 and 20, respectively, that extend away from the outer surface of the sleeve 10 by a predetermined amount in order to effectively contact the edge surfaces 22 and 24 of the first and second post segments 2 and 4, as explained in greater detail below. For example, the very top of abutment surface 18 may extend about 0.05 inch, and preferably 0.047±0.015 inch, away from the outer surface of the sleeve 10. The interference or abutment surfaces are substantially coplanar relative to a radial cross-section or plane Y of the sleeve at its center or are slightly spaced away from each other relative to the radial cross-section or plane Y.

Each protruding tab 14 and 16 is preferably rectangular in shaped as clearly shown in FIG. 2. The protruding tabs 14 and 16 are integral with the sleeve 10 and are formed therefrom by virtue of a punched U-shaped slot 26 bounding the tab. Such a configuration allows the sleeve 10 to be manufactured from a single piece of material, such as a single piece of rolled steel. The compression slot 12 and the U-shaped slots 26 are then cut in the sleeve 10 to produce the connector. Alternatively, a piece of steel can be rolled so as to leave an opening that defines the slot 12. The slots 26 can be cut before or after the rolling process.

FIG. 3 shows an end view of the sleeve 10 clearly depicting the slot 12 and the protruding tabs 14 and 16. It can be readily appreciated that the sleeve 10 can be dimensioned relative to the post segments such that natural resiliency of the material from of which the sleeve is made results in the sleeve having biasing forces that urge it tightly against the interior surfaces of the post segments 2 and 4, and that urge the tabs away from the side walls of the sleeve to interfere with the ends of the post segments.

In FIG. 4, the connecting operation according to the preferred embodiment of the present invention is depicted in cross-section. In this operation the sleeve 10 is inserted into the post segments 2 and 4, and the post segments are pressed together. When the end of the sleeve 10 contacts the annular rings 6 in one of the post segments, the sleeve 10 will become compressed by the annular rings with compression slot 12 narrowing as the sleeve is inserted. The sleeve 10 will thus slide, for example, into the post segment 2 until the abutment surface 18 of the protrusion tab 14 contacts the engaging end surface 22 of the post segment. In the meantime, the protrusion tab 16, which inclines in the opposite direction from the protrusion tab 14, is pushed inwardly relative to the sleeve by the inside surface of the post segment 2 until it may become substantially flush with the outer surface of the sleeve 10, or projects slightly outwardly therefrom.

When the sleeve 10 can be inserted no further into the post segment 2 due to the interference of the abutment surface 18 with the engaging surface 22, continued pressure on the post segments 2 and 4 will cause the sleeve 10 to compress and slide within the annular rings 6 of the post segment 4. When the engaging surface 24 of the post segment 4 contacts the inclined surface of the protruding tab 14, the tab 14 will be pushed inwardly of the sleeve so as to become substantially flush with the outer surface of the outer sleeve 10. When this movement occurs, the post segment 4 will contact the post segment 2 at their engaging surfaces 24 and 22, respectively. Therefore, the sleeve 10 will be invisible from the outside, yet will be firmly gripped by the annular rings 6 in each of the post segments 2 and 4. Further, the compression slot 12 will result in a constant biasing force existing between the sleeve 10 outward toward the annular rings 6, thus ensuring that the sleeve 10 will remain in its proper location. Still, further, the fact that the abutment surfaces 18 and 20 of the protruding tabs 14 and 16 are substantially coplanar relative to a cross-section at the center of the sleeve 10 will ensure that substantially one half of the sleeve 10 will be received in each of the post segments 2 and 4. Therefore, the joint between the post segments 2 and 4 will be very strong and quite resistant to bending.

As described above, the one-piece sleeve 10 can be used quickly and easily to connect the post segments 2 and 4 without tools, specialized knowledge, or extra steps. Further, it is readily apparent that the one-piece connector sleeve 10 is easy to manufacture, requiring only minimum rolling, cutting, punching, or bending.

Disassembly of the above-discussed structure is also easy. The post segments 2 and 4 are merely pulled apart and the sleeve 10 is removed therefrom. Since no permanent deformation of the sleeve 10 occurs during assembly, a disassembled sleeve 10 can be used again with the same or different post segments. Therefore, the flexibility and reconfigurability of the present invention will offer advantageous to the manufacturer and user alike.

The preferred material for the connector sleeve is metal, most preferably cold rolled steel. This material is very strong and also flexible and resilient. However, those of ordinary skill in this field understand that other materials, such as plastics, composites, and the like may be used depending upon the application for which the posts are designed.

Thus, what has been described is a light-weight, easy to manufacture, easy to assemble post connector capable of supporting great loads in a variety of applications. The present invention will find use in warehouses, stores, homes, or any other place where assembly of post segments to form extended supports is desirable.

While the present invention has been described with respect to what is presently considered to be the preferred embodiment, it is to be understood that the invention is not limited to this disclosed embodiment. On the contrary, the present invention is intended to cover various modifications and equivalent structures included within the spirit and scope of the following claims.

What is claimed is:

1. A connector sleeve device for connecting together first and second hollow posts each having an end surface, said connector sleeve device comprising:
   a sleeve having an outer surface dimensioned to be inserted into the interior of both the first and second posts;
   a first flexible generally rectangularly shaped protrusion formed by a generally U-shaped opening in a first side of said sleeve at a mid-region thereof, said first protrusion being biased in a direction away from the outer surface of said sleeve and forming an incline with respect to said outer surface, said first protrusion further having a first interference surface adapted to abut the end surface of the first post when said sleeve is inserted into the first post, for preventing said sleeve from being moved further into the first post; and
   a second flexible generally rectangularly shaped protrusion formed by a generally U-shaped opening in a second side of said sleeve at the mid-region thereof, said second protrusion being biased in a direction away from the outer surface of said sleeve and forming an incline with respect to said outer surface, said second protrusion further having a second interference surface adapted to abut the end surface of the second post when said sleeve is inserted into the second post, for preventing said sleeve from being moved further into the second post, said second interference surface being disposed substantially in the same cross-sectional plane of said sleeve as is said first interference surface, said inclines of said respective first and second protrusions inclining in opposite directions, and said first and second sides of said sleeve being generally opposed to each other, whereby the end surfaces of the first and second posts are permitted to come into contact.

2. A connector sleeve according to claim 1, wherein said sleeve comprises a hollow cylinder having a generally longitudinally extending slot therein.

3. A connector sleeve according to claim 1, further including a compression slot formed in said sleeve and extending in a longitudinal direction thereof.

4. A post connector for connecting together first and second hollow posts each having an end surface, said post connector comprising:
   a compressible insert adapted to be partially inserted into each of the first and second posts, said insert having a compression slot extending in a longitudinal direction thereof to allow said insert to be compressed during insertion into the first and second posts; and
   first and second generally rectangularly shaped inclined protrusions formed from a side wall of said insert, bounded by a complementary U-shaped opening therein, bent outwardly therefrom, and inclining in opposite directions, each protrusion having an abutment surface for abutting an end surface of one of said first post and said second post, said abutment surfaces being substantially coplanar relative to a cross-section of said insert to cause the end surfaces of the first and second posts to be adjacent each other with said insert substantially entirely within the posts when the posts are pressed together.

5. A connector according to claim 4, wherein said insert comprises a hollow cylinder with said compression slot extending entirely through the cylinder wall from one end of said insert to the other end thereof.

6. A connector according to claim 4, wherein said inclined protrusions are biased away from the side wall of said insert to cause said abutment surfaces respectively to abut opposing end surfaces of the first post and the second post.

7. A connector according to claim 4, wherein each abutment surface extends approximately 0.05 inch outwardly away from the outer surface of said side wall of said insert.

8. A connector according to claim 4, wherein said first and second protrusions are disposed on opposite sides of said insert.

9. A connector for coupling together first and second hollow, generally cylindrical posts each having an end surface and at least one annular ring on an interior surface thereof, said connector comprising:
   a generally cylindrical bushing adapted to fit partially within the first post and partially within the second post, said bushing being compressible by said rings to provide a compression fit between it and the posts;
   first and second resilient tabs disposed on said bushing and each having an abutment surface for engaging the respective end surfaces of the posts, each tab in a first position protruding from a surface of said bushing in order to abut the end surface of one of the posts, and in a second position lying substantially flush with the outer surface of said bushing, said tabs being biased toward their first positions to cause said bushing to assume a predetermined positional relationship with respect to the posts when the first and second posts are forced together.

10. A connector according to claim 9, wherein said first and second tabs are disposed on opposite sides of said bushing, each said tab comprising an integral portion of said bushing and having an inclined surface inclining outwardly from the outer surface of said bushing.

11. A connector according to claim 9, wherein said first and second tabs incline in opposite directions, said abutment surfaces of said tabs being substantially coplanar relative to a cross-sectional plane of said bushing.

12. A connector according to claim 9, wherein said bushing comprises a hollow cylinder having a longitudinally extending compression slot therein.

13. A connector according to claim 9, wherein said abutment surfaces of said tabs are substantially in the same radial plane passing through a center of said bushing.

14. A connector according to claim 9, wherein the outside diameter of the uncompressed bushing is less than the inside diameter of said first and second posts, but greater than the inside diameter of the annular rings.

* * * * *

UNITED STATES PATENT AND TRADEMARK OFFICE
CERTIFICATE OF CORRECTION

PATENT NO. : 5,022,777

DATED : June 11, 1991

INVENTOR(S) : ALBERT KOLVITES

It is certified that error appears in the above-identified patent and that said Letters Patent is hereby corrected as shown below:

COLUMN 1

Line 42, "desireable" should read --desirable--.

COLUMN 3

Line 33, "desireable" should read --desirable--.
Line 58, "shaped" should read --shape--.

COLUMN 4

Line 5, "of which" should read --which--.

COLUMN 5

Line 1, "advantageous" should read --advantages--.
Line 15, "desireable." should read --desirable.--.
Line 57, "face surface," should read --face,--.

UNITED STATES PATENT AND TRADEMARK OFFICE
CERTIFICATE OF CORRECTION

PATENT NO. : 5,022,777

DATED : June 11, 1991

INVENTOR(S) : ALBERT KOLVITES

It is certified that error appears in the above-identified patent and that said Letters Patent is hereby corrected as shown below:

COLUMN 6

Line 65, "claim 9," should read --claim 10,--.

Signed and Sealed this

Twenty-third Day of February, 1993

Attest:

STEPHEN G. KUNIN

*Attesting Officer*    Acting Commissioner of Patents and Trademarks